United States Patent
Koehler et al.

(10) Patent No.: US 11,222,404 B2
(45) Date of Patent: Jan. 11, 2022

(54) IMAGE RECONSTRUCTION

(71) Applicant: KONINKLIJKE PHILIPS N.V., Eindhoven (NL)

(72) Inventors: Thomas Koehler, Norderstedt (DE); Bernhard Johannes Brendel, Norderstedt (DE); Rolf Dieter Bippus, Hamburg (DE); Frank Bergner, Hamburg (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 643 days.

(21) Appl. No.: 16/078,239

(22) PCT Filed: Mar. 24, 2017

(86) PCT No.: PCT/EP2017/057090
§ 371 (c)(1),
(2) Date: Aug. 21, 2018

(87) PCT Pub. No.: WO2017/162858
PCT Pub. Date: Sep. 28, 2017

(65) Prior Publication Data
US 2021/0217140 A1  Jul. 15, 2021

(30) Foreign Application Priority Data
Mar. 25, 2016 (EP) .................................... 16162480

(51) Int. Cl.
*G06T 5/00* (2006.01)
*G06T 5/50* (2006.01)

(52) U.S. Cl.
CPC ................ *G06T 5/002* (2013.01); *G06T 5/50* (2013.01); *G06T 2207/10081* (2013.01); *G06T 2207/20224* (2013.01)

(58) Field of Classification Search
CPC .. G06T 5/002; G06T 5/50; G06T 5/10; G06T 5/20; G06T 5/30; G06T 5/40; G06T 5/007; G06T 5/005; G06T 2207/10081; G06T 2207/20224; G06T 2207/20081; G06T 2207/10072; G06T 2207/10088; G06T 2207/10108; G06T 2207/30004; G06T 2207/30168; G06T 2207/10116; G06T 2207/20012; G06T 2207/20021; G06T 2207/20032; G06T 11/008; G06T 11/003; G06T 11/005; G06T 11/006; G06T 2211/408; G06T 2211/424; G06T 7/0012;
(Continued)

(56) References Cited

U.S. PATENT DOCUMENTS 7,840,066 B1  11/2010  Chen
10,022,098 B2*  7/2018  Kleinszig ............... A61B 6/032
(Continued)

FOREIGN PATENT DOCUMENTS

EP  2333697  6/2011
EP  2843619  3/2015

*Primary Examiner* — Jose L Couso
(74) *Attorney, Agent, or Firm* — Larry Liberchuk

(57) ABSTRACT

In a method and system for reconstructing computed tomography image data in which CT image data is de-noised. Then simulated noise is added, followed by another de-noising step to estimate the bias. Then, the estimated bias information is used to correct the original de-noised image data to arrive at second pass image data.

14 Claims, 2 Drawing Sheets

(58) Field of Classification Search
CPC ...... G06K 9/40; G06K 9/4628; G06K 9/6242; G06K 9/6271; G06K 9/66; G06K 9/6202; G06K 9/6273; G06K 2209/05; A61B 6/032; A61B 6/5205; A61B 6/5258; A61B 6/542; A61B 6/583; A61B 6/03
See application file for complete search history.

(56) References Cited

U.S. PATENT DOCUMENTS

| | | |
|---|---|---|
| 2002/0034337 A1 | 3/2002 | Shekter |
| 2007/0165112 A1 | 7/2007 | Shinmei |
| 2010/0061642 A1 | 3/2010 | Kondo |
| 2011/0158498 A1 | 6/2011 | Li et al. |
| 2011/0268328 A1* | 11/2011 | Bar-Aviv ................. G06T 5/002 382/128 |
| 2012/0134561 A1 | 5/2012 | Xu |
| 2012/0224760 A1* | 9/2012 | Goshen .................... G06T 5/002 382/131 |
| 2013/0121553 A1* | 5/2013 | Thibault ................ G06T 11/006 382/131 |
| 2013/0202080 A1* | 8/2013 | Yu ........................ A61B 6/5205 378/19 |
| 2013/0202177 A1* | 8/2013 | Bar-Aviv .............. G06T 11/008 382/131 |
| 2014/0193086 A1 | 7/2014 | Zhang |
| 2016/0171727 A1* | 6/2016 | Bouchard ............ G06K 9/6273 382/131 |
| 2017/0000442 A1* | 1/2017 | Takahashi ............. G06T 7/0012 |
| 2017/0135659 A1* | 5/2017 | Wang .................... A61B 6/5258 |
| 2017/0186195 A1* | 6/2017 | Lin ....................... A61B 6/5205 |
| 2018/0089863 A1* | 3/2018 | Marschner ......... G01R 33/5608 |
| 2018/0204305 A1* | 7/2018 | Wang ..................... G06T 5/002 |

* cited by examiner

IMAGE RECONSTRUCTION

CROSS REFERENCE TO RELATED APPLICATIONS

This application is the U.S. National Phase application under 35 U.S.C. § 371 of International Application No. PCT/EP2017/057090, filed Mar. 24, 2017, published as WO 2017/162858 on Sep. 28, 2017, which claims the benefit of European Patent Application Number 16162480.4 filed Mar. 25, 2016. These applications are hereby incorporated by reference herein.

FIELD OF THE INVENTION

The present invention generally relates to a method, system and computer program product for reconstructing computed tomography image data.

BACKGROUND OF THE INVENTION

Noise reduction in computed tomography (CT) is an important part of reconstruction algorithms. For spectral and dual energy computed tomography (CT) this is even more important, since anti-correlated noise plays an excessive role, lowering a signal-to-noise ratio compared to single-energy CT imaging.

Image processing of CT data involves several non-linear processing steps, in which excessive noise leads to a non-desirable bias in the final images. Dual-energy and spectral CT is particularly suitable to obtain quantitative information, but bias may result in inaccuracies resulting in less reliable quantitative information, especially if the bias is large. Since the bias increases with the noise level, various de-noising algorithms are applied at various processing steps, e.g. before spectral decomposition, after decomposition in projection domain and in image domain. Although considerable progress has been made in optimizing and tuning these de-noising algorithms in order to minimize the residual bias in the final images, it has not yet been achieved to reduce the bias sufficiently.

SUMMARY OF THE INVENTION

The present invention aims to solve, amongst others, the above mentioned drawback.

Embodiments according to the present invention are directed to a method for reconstructing computed tomography image data comprising the steps of obtaining computed tomography image data comprising initial noise data; first pass de-noising the computed tomography image data to generate first pass image data; adding artificial noise data to the first pass image data where noise distribution matches the initial noise data to generate simulated image data; second pass de-noising the simulated image data to generate de-noised simulated image data; determining bias information of the de-noised simulated image data; estimating bias information of the first pass image data based on the determined bias information of the de-noised simulated image data; correcting the first pass image data based on the estimated bias information of the first pass image data to generate second pass image data. This method allows for determining a better indication of the bias due to the first de-noising step and to use this knowledge to provide second pass image data that is more reliable and therefore a better base for quantification of the image.

The initial noise data preferably includes noise relevant parameters, such as local noise variance estimates, noise power spectrum, correlation coefficient, filters used, slice thickness, or estimates thereof. These parameters are readily available or derived from the image data or scan settings.

The bias information of the de-noised simulated image data is preferably determined by subtracting the de-noised simulated image data from the first pass image data. The bias information of the first pass image data is preferably estimated to be the same as the bias information of the de-noised simulated image data. The first pass image data is preferably corrected by subtracting the estimated bias information of the first pass image data from the first pass image data. These steps are all require no additional calculation or modeling, while still resulting in accurate results.

In a preferred embodiment the method is based on a set of simulated noise image data generated by adding different simulated noise data to the first pass image data. This allows for averaging image data or identifying and potentially discarding clearly erroneous information that may be present in single noise data.

In a preferred embodiment the computed tomography image data is multi-energy computed tomography image data, preferably dual-energy or spectral computed tomography image data. Since multi-energy image data has a lower signal-to-noise ratio, the advantages of the present invention are particularly relevant. Furthermore, a strong advantage of multi-energy imaging is the potential for obtaining quantitative information from image data. Reducing the bias increases the accuracy and reliability of this quantitative information.

Further embodiments of the present invention are directed to a computer program product to execute, when run on a computer, the method of the present invention; a reconstruction system for reconstructing computed tomography image data; and a computed tomography system comprising such a reconstruction system.

Still further aspects and embodiments of the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention. To better visualize certain features may be omitted or dimensions may be not be according to scale.

DETAILED DESCRIPTION OF EMBODIMENTS

The present invention is illustrated using dual-energy CT image data, but the invention is equally relevant for spectral and other multi-energy CT image data. The invention is also relevant for other types of multi-energy x-ray imaging. Also the present invention is even beneficial for single energy x-ray imaging, but there the effect will be less pronounced, since the problem of anti-correlated noise is less than for multi-energy imaging.

Figure 1:
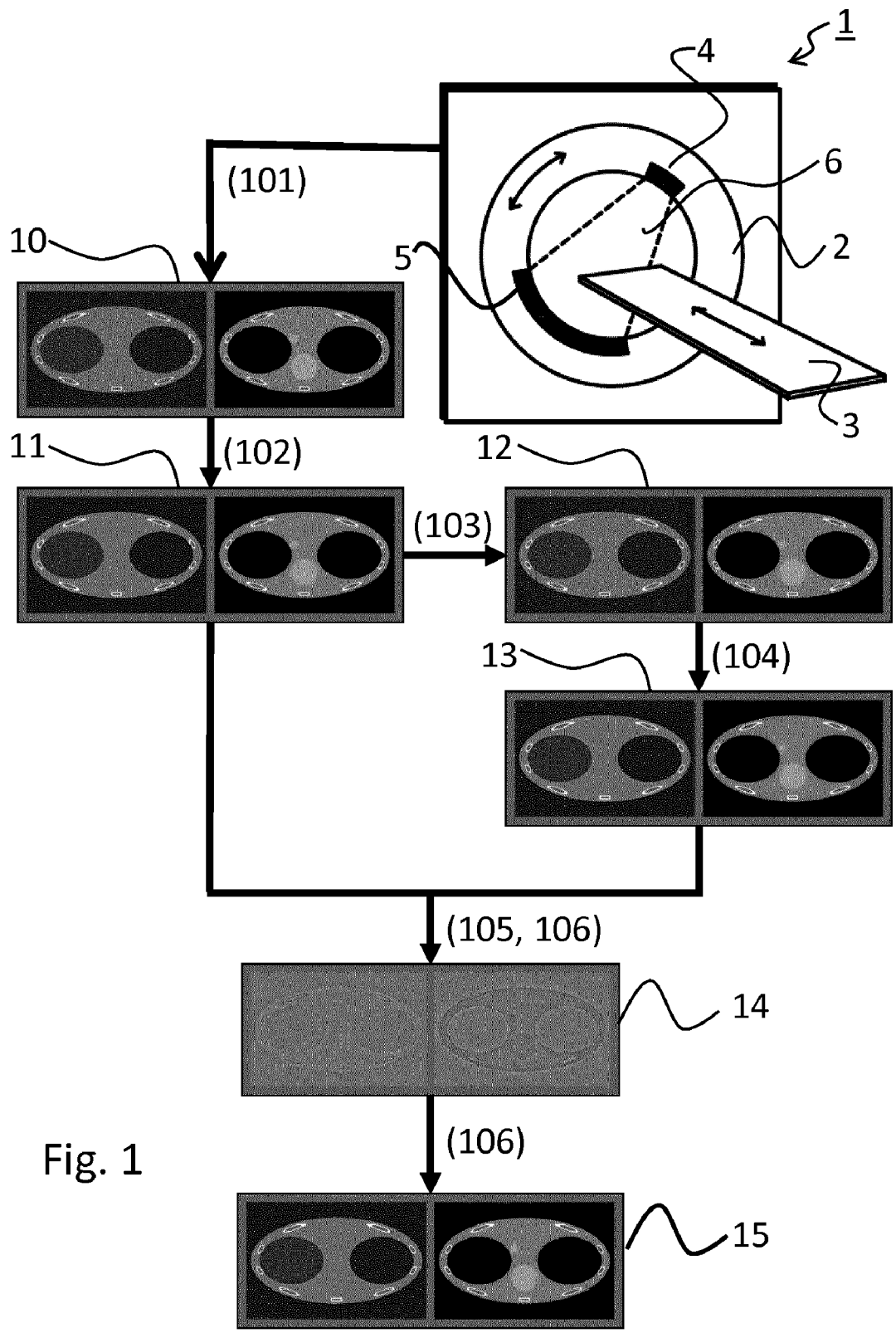
FIG. 1 shows an illustrated flowchart of the reconstruction process according to the present invention.

FIG. 1 illustrates the invention in the form of a flowchart showing intermediate results during the steps of the reconstruction process. The claimed reconstruction process is executed by a reconstruction system. Preferably at least one of the components of the system executing the process system is implemented in a processor, more preferably more than one is implemented in a processor and most preferably all steps are implemented in a processor or in several connected processors.

An object of interest, such as a patient or an organ within a patient, is medically scanned using a CT device 1 to generate CT image data 10. The CT device comprises a rotatable gantry 2 that is rotated around an examination area 6 during a scan. The gantry houses a radiation source 4 and detector 5, which are preferably capable of generating a multi-energy image data 10, such as a dual energy source 45 and/or a dual energy or spectral detector 6. The object of interest is normally positioned on a support 3, which is translated through the examination area 6 during a scan to obtain slices of CT image data 10 of the object of interest. In multi-energy image data various types of image information may be obtained. For instance, in FIG. 1, for each step two images are shown obtained by dual energy CT image acquisition, one represents the contribution of the photoelectric effect, the other the contribution of Compton-scattering to the total x-ray attenuation. The process of the present invention is applied to both images with advantageous results.

The reconstruction system obtains 101 the dual energy CT image data 10 from the CT device 1 and applies 102 a first pass de-noising algorithm to the CT image data 10 to obtain first pass image data 11. In known reconstruction system this first pass data is used to generate visual images and quantification of desired properties. However, even though de-noising algorithms have improved strongly over the years, they are always based on models and assumptions and are inherently never perfect. This results in not only removal of noise, but also of signal, in other words: the de-noised images have a bias. This contributes to inaccuracies and artefacts, which negatively influences image quality and any quantification derived therefrom, particularly in image data with a low signal-to-noise ratio, such as multi-energy CT or older or low-end CT or other x-ray devices. To improve this, further processing steps are performed in light of the present invention to overcome this inherent drawback of de-noising algorithms.

The CT image data 10 comprises initial noise data that has information on the noise in the CT image data 10. The noise data may comprise parameters, which characterize the noise, such as local noise variance estimates, noise power spectrum, correlation coefficient. These parameters might have been obtained by knowledge about x-ray tube voltage and current, filters used during reconstruction, slice thickness and alike. Usually, local noise variance estimates may be obtained by a standard error-propagation method or by image analysis. Most image based de-noising methods require such a local noise estimate as input.

In the first additional step of the presently claimed reconstruction method artificial noise data is added 103 to the first pass image data 11 to obtain simulated image data 12. Noise characteristics of the artificial noise data are similar to that of the initial noise data, such as similar standard deviation, correlation, spatial variation, or combinations of some or all of these. Preferentially, the noise simulation has the same noise parameters as the actual noise on the CT image data 10. Of course, only a different noise realization can be used as the actual noise on the CT image data 10 is not known. In case pre-processing has not introduced excessive, strongly non-linear smoothing, realistic noise data may be obtained from a reconstruction of an object-less scan using the same reconstruction parameters (field-of-view, reconstruction filter, slice thickness, etc.), where the image values are re-scaled in the end to match the local noise estimate.

In the next step the simulated image data 12 receives a second-pass de-noising 104 to obtain de-noised simulated image data. The same or different de-noising algorithms may be used as in the first pass de-noising of the CT image data 10.

Next, bias information of the de-noised simulated image data is determined 105. A preferred, and relatively straightforward manner, to determine said bias information is by subtracting the de-noised simulated image data 13 from the first pass image data 11. The determined bias of the de-noised simulated images itself suffers from noise. In order to reduce this noise, biases may be calculated from an ensemble of simulated noise image data 12, each being processed to generate an ensemble of de-noised simulated image data 104 and a representative value of the bias information of the de-noised simulated image data may be determined, e.g. by taking the mean value or a weighted average of the biases.

The determined bias information of the de-noised simulated image data is then used as input to estimate 105 bias information 105 of the first pass image data 11. In a good approximation, the bias information 14 of the first pass image data 11 is estimated 106 to be the same as the bias information of the de-noised simulated image data 13. If it is known that areas of the bias information of the de-noised simulated image data 13 are under- or overestimated, this may be taken into account in the estimation 106. The estimated 105 bias information 14 of the first pass image data 102 may be improved by using the knowledge that de-noising always needs to trade-off between noise and resolution and therefore first pass image data 11 is typically smoother than the unknown 'true' image. For instance, as the ground truth of the de-noising step 104 is known to be the first pass images 11, a "best matching" high pass filter might be derived that, when applied to the de-noised simulated image data 13, results in improved similarity of these images with the ground truth image.

In the final step, the first pass image data 11 is corrected 107 based on the estimated bias information 14 of the first pass image data 11 to generate second pass image data 15. The most straightforward way to achieve this is by subtracting the estimated bias information 14 of the first pass image data 11 from the first pass image data 11. As said estimated bias information 14 provides an improved indication of the actual bias, the second pass image data 15 is better de-noised and therefore closer to the 'true' situation. As such, the second pass image data 15 provides an improved input for image analysis by a physician or further processing steps, for instance to generate a quantitative image.

Figure 2:
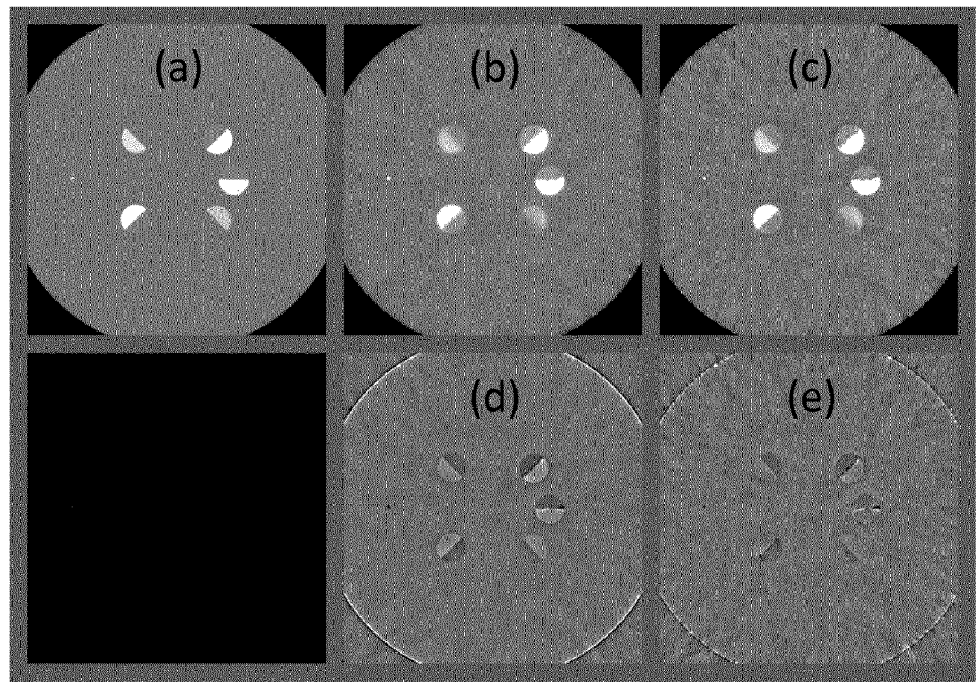
FIG. 2 shows exemplary results of the reconstruction process according to the present invention.
Figure 3:
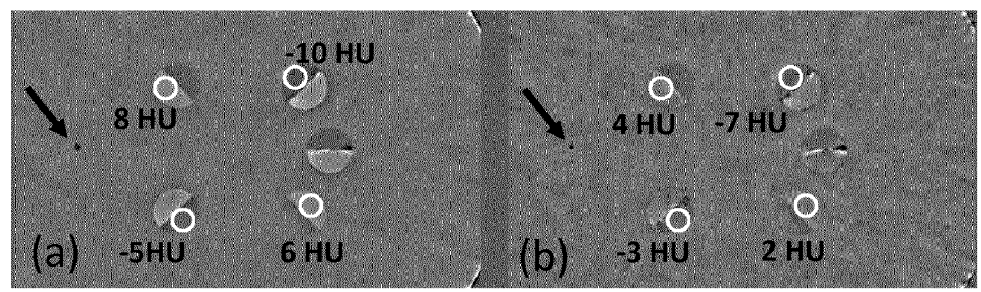
FIG. 3 shows zoomed-in versions of the bias images of FIG. 2.
Figure 4:
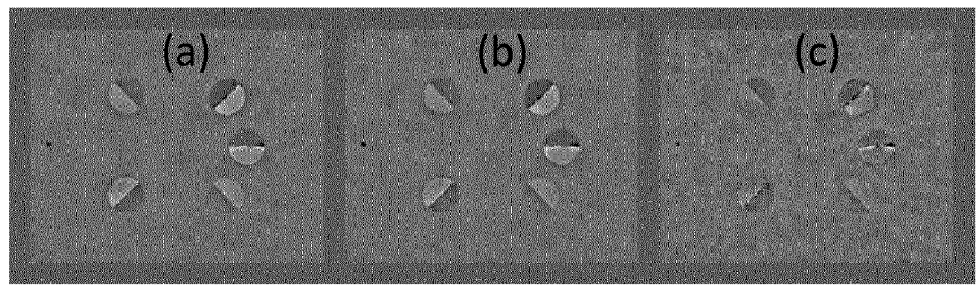
FIG. 4 shows a bias comparison of the present invention with a state-of-the-art method.

FIGS. 2, 3 and 4 illustrate the effectiveness of the present invention and that it indeed leads to improved de-noising results compared to state-of-the-art de-noising methods.

FIG. 2a shows a simulated object. FIGS. 2b and 2c show scatter images of the first-pass image data and second-pass image data respectively of the simulated object, shown at a window of 100 Houndsfield units (HU). The first-pass image is considerably smoother than that of the second-pass image.

FIGS. 2d and 2e show the respective bias images of the first pass image data and second pass image data, again also shown at a window of 100 HU and which are shown zoomed-in in FIGS. 3a and 3b. Several measurements of remaining bias are included in FIGS. 3a and 3B as well and the remaining bias is clearly reduced in the second-pass image compared to the first-pass image. Furthermore, the high-contrast pin indicated by the arrow shows reduced smoothing in the second-pass image compared to the first-pass image.

FIG. 4a shows the bias a first-pass image of a simulated object. FIG. 4b shows the first first-pass image with an additional Bregman iteration, which is a state-of-the-art de-noising algorithm [Goldstein & Other, "The Split Bregman Method For L1 Regularized Problems", PROBLEMS, SIAM J. Imaging Sci., 2(2), 323-343, 2009]. The Bregman-treated image is indeed less smooth than the first-pass image, but as can be seen in FIG. 4c, the second-pass image as used in the present invention shows significantly better results and therefore forms also a much better input for quantification of the image.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for reconstructing computed tomography image data, comprising:
    obtaining computed tomography image data comprising initial noise data;
    first pass de-noising the computed tomography image data to generate first pass image data;
    adding artificial noise data to the first pass image data where noise distribution matches the initial noise data to generate simulated image data;
    second pass de-noising the simulated image data to generate de-noised simulated image data;
    determining bias information of the de-noised simulated image data;
    estimating bias information of the first pass image data based on the determined bias information of the de-noised simulated image data; and
    correcting the first pass image data based on the estimated bias information of the first pass image data to generate second pass image data.

2. The method according to claim 1 wherein the initial noise data includes noise relevant parameters, wherein the noise relevant parameters include at least one of local noise variance estimates, noise power spectrum, correlation coefficient, filters used, slice thickness, and estimates thereof.

3. The method according to claim 1, wherein the bias information of the de-noised simulated image data is determined by subtracting the de-noised simulated image data from the first pass image data.

4. The method according to claim 1, wherein the bias information of the first pass image data is estimated to be the same as the bias information of the de-noised simulated image data.

5. The method according to claim 1, wherein the first pass image data is corrected by subtracting the estimated bias information of the first pass image data from the first pass image data.

6. The method according to claim 1, wherein
    a set of simulated noise image data is generated by adding different simulated noise data to the first pass image data;
    second pass de-noising the set of simulated noise image data to generate a set of de-noised simulated image data; and
    bias information of the first pass image data is estimated based on the set of de-noised simulated image data.

7. The method according to claim 1 wherein the computed tomography image data is multi-energy computed tomography image data.

8. A reconstruction system for reconstructing computed tomography image data including initial noise data, comprising:
    a memory that stores a plurality of instructions; and
    processor circuitry that couples to the memory and is configured to execute the plurality of instructions to:
        de-noise the computed tomography image data to generate first pass image data;
        add artificial noise data to the first pass image data where noise distribution matches the initial noise data to generate simulated image data;
        de-noise the simulated image data to generate de-noised simulated image data;
        determine the bias of the de-noised simulated image data;
        estimate the bias of the first pass image data based on the determined bias information of the de-noised simulated image data; and
        correct the first pass image data based on the estimated bias information of the first pass image data to generate second pass image data.

9. The system according to claim 8 wherein the initial noise data includes noise relevant parameters, wherein the noise relevant parameters include at least one of local noise variance estimates, noise power spectrum, correlation coefficient, filters used, slice thickness, and estimates thereof.

10. The system according to claim 8, wherein the bias information of the de-noised simulated image data is determined by subtracting the de-noised simulated image data from the first pass image data.

11. The system according to claim 8, wherein the first pass image data is corrected by subtracting the estimated bias information of the first pass image data from the first pass image data.

12. A computed tomography system comprising a reconstruction system according to claim 8.

13. The computed tomography system according to claim 12 configured to acquire multi-energy computed tomography image data.

14. A non-transitory computer readable storage medium containing instructions that, when executed by processor circuitry, cause the processor circuitry to perform a method for reconstructing computed tomography image data, comprising:

obtaining computed tomography image data comprising initial noise data;

first pass de-noising the computed tomography image data to generate first pass image data;

adding artificial noise data to the first pass image data where noise distribution matches the initial noise data to generate simulated image data;

second pass de-noising the simulated image data to generate de-noised simulated image data;

determining bias information of the de-noised simulated image data;

estimating bias information of the first pass image data based on the determined bias information of the de-noised simulated image data; and correcting the first pass image data based on the estimated bias information of the first pass image data to generate second pass image data.

* * * * *